US005639549A

United States Patent [19]

Fukunaga et al.

[11] Patent Number: 5,639,549

[45] Date of Patent: Jun. 17, 1997

[54] FIXING ROLL

[75] Inventors: Noritomo Fukunaga; Michiyoshi Kurosawa, both of Tokyo, Japan

[73] Assignee: Kinyosha Co., Ltd., Tokyo, Japan

[21] Appl. No.: 880,697

[22] Filed: May 8, 1992

[51] Int. Cl.[6] .......... B32B 15/00

[52] U.S. Cl. .......... 428/379; 428/375; 428/380; 428/383; 428/390; 428/384; 427/247; 427/344; 427/384; 427/428

[58] Field of Search .......... 428/375, 421, 428/379, 380, 382, 384, 390, 220, 329, 383; 355/285, 295; 156/329, 338; 427/428, 247, 344, 372.2, 384

[56] References Cited

U.S. PATENT DOCUMENTS

| | | | |
|---|---|---|---|
| 4,199,626 | 4/1980 | Streyjewski et al. | 428/421 |
| 4,562,335 | 12/1985 | Katsuno et al. . | |
| 4,702,964 | 10/1987 | Hirano et al. | 428/447 |
| 4,810,564 | 3/1989 | Takayashi et al. | 428/421 |
| 4,819,020 | 4/1989 | Matsushiro et al. . | |
| 4,830,920 | 5/1989 | Hayashi et al. | 428/421 |

FOREIGN PATENT DOCUMENTS

| | | |
|---|---|---|
| 0186314 | 11/1985 | European Pat. Off. . |
| 0302517 | 8/1988 | European Pat. Off. . |
| 0424053A2 | 10/1990 | European Pat. Off. . |

*Primary Examiner*—Merrick Dixon
*Attorney, Agent, or Firm*—Nixon & Vanderhye

[57] ABSTRACT

Disclosed is a fixing roll, comprising a core metal, a heat resistant elastic layer formed to cover the circumferential outer surface of the core metal, and a surface layer formed to cover the circumferential outer surface of the heat resistant elastic layer, the surface layer being formed of a tetrafluoroethylene-perfluoroalkyl vinyl ether copolymer resin film of a double layer structure consisting of an inner layer having a volume resistivity of $10^{11}$ Ω.cm or less and an outer layer having a thickness falling within a range of between 3 μm and 50 μm, and the entire thickness of the resin film falling within a range of between 20 μm and 500 μm.

7 Claims, 1 Drawing Sheet

FIXING ROLL

BACKGROUND OF THE INVENTION

1. Field of the Invention

The present invention relates to an improvement of a fixing roll for thermally fixing an unfixed picture image or the like in an electrophotographic reproducing machine or an electronic printer to a recording material such as a paper sheet.

2. Description of the Related Art

FIG. 2 shows a fixing roll of a high durability, which is widely used in recent years in an electrophotographic reproducing machine. As shown in the drawing, the conventional fixing roll comprises a core metal 1, a heat resistant elastic layer 2 formed to cover the circumferential surface of the core metal 1, and a surface layer 3 consisting of PFA resin (tetrafluoroethylene-perfluoroalkyl vinyl ether copolymer). The surface layer 3 is formed in a thickness of tens of to hundreds of μm.

The PFA resin forming the surface layer 3 exhibits an excellent release property and, thus, permits effectively suppressing the tonor off-set problem, i.e., the problem that the tonor is attached to the surface of the fixing roll in the thermal fixing step. Also, the PFA resin surface layer is thin, i.e., not thicker than hundreds of μm. In addition, a heat resistant rubber or a heat resistant sponge used for forming the heat resistant elastic layer 2 is soft. The small thickness of the PFA resin surface layer and the softness of the heat resistant elastic layer 2 are combined to permit a sufficient nipping width required for the thermal fixing, with the result that the fixing roll can be used satisfactorily over a long period of time.

However, the PFA resin is a high insulator having a volume resistivity of at least $10^{16}$ Ω.cm and, thus, tends to be charged easily. When used for forming the surface layer of a fixing roll, the PFA resin is frictionally charged up to scores of volts to scores of thousands of volts by the contact with a copying paper in the thermal fixing step or with another roll or belt. Because of the charging to a high voltage, tonor or paper dust is electrostatically attached to the fixing roll surface, with the result that the high release property of the PFA resin is impaired so as to bring about the tonor off-set problem noted above.

For solving the above-noted problem brought about by the electrostatic charging, it is proposed to lower the volume resistivity of the heat resistant elastic layer 2 so as to suppress the electrostatic charging on the surface of the fixing roll. However, it is impossible to suppress the charging sufficiently by lowering the volume resistivity in the case where the thickness of the surface layer 3 formed of the PFA resin is increased. It is also proposed to suppress the electrostatic charging by lowering the volume resistivity of the PFA resin layer 3. It may be reasonable to add carbon black or metal powder to the PFA resin in order to lower the volume resistivity of the PFA resin layer 3. In this case, however, the high release property of the PFA resin is impaired, leading to a tonor off-set problem in a short time.

SUMMARY OF THE INVENTION

An object of the present invention is to provide a fixing roll comprising a PFA resin surface film of a double layer structure consisting of an inner layer having a predetermined volume resistivity and thickness and an outer layer having a predetermined thickness such that the PFA resin permits ensuring a sufficient nipping width while retaining a high release property.

Another object is to provide a fixing roll which permits suppressing the electrostatic charging amount.

Still another object of the present invention is to provide a fixing roll which permits preventing a tonor off-set problem from being brought about in a short time.

According to the present invention, there is provided a fixing roll, comprising a core metal, a heat resistant elastic layer formed to cover the outer circumferential surface of the core metal, and a surface layer covering the outer circumferential surface of the heat resistant elastic layer, the surface layer being formed of tetrafluoroethylene-perfluoroalkyl vinyl ether copolymer resin film and consisting of an inner layer having a volume resistivity of $10^{11}$ Ω.cm or less and an outer layer having a thickness of 3 to 50 μm, and the thickness of the entire surface layer being 20 to 500 μm.

In the present invention, the surface layer of the fixing roll is formed of a resin film of a double layer structure consisting of an inner layer having a volume resistivity of $10^{11}$ Ω.cm or less and an outer layer having thickness of 3 to 50 μm. In addition, the resin film forming the surface layer is defined to have a thickness of 20 to 500 μm. The particular construction of the present invention permits ensuring a sufficient nipping width while maintaining a high release property inherent in the PFA resin. In addition, the electrostatic charging amount can be suppressed and the tonor off-set problem can be solved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
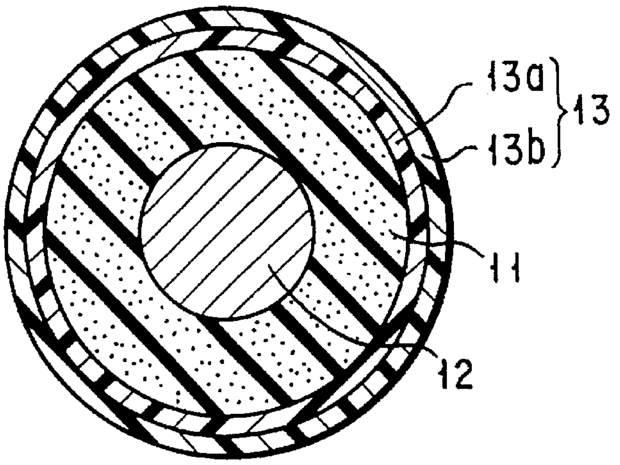
FIG. 1 is a cross sectional view showing a fixing roll according to one embodiment of the present invention.
Figure 2:
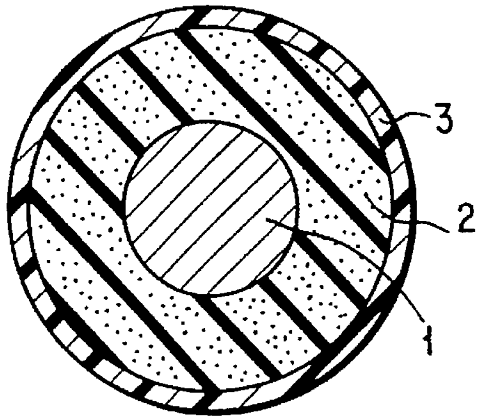
FIG. 2 is a cross sectional view showing a conventional fixing roll.

The fixing roll of the present invention comprises a surface layer formed of a film of tetrafluoroethylene-perfluoroalkyl vinyl copolymer resin (PFA resin). The PFA film is of a double layer structure consisting of an inner layer having a low resistivity, i.e., a volume resistivity of $10^{11}$ Ω.cm or less and an outer layer covering the outer surface of the inner layer. The inner layer is intended to suppress the electrostatic charging amount of the outer layer which provides the roll surface. In the present invention, the outer layer of the PFA resin film is defined to have a thickness falling within a range of between 3 μm and 50 μm. If the outer layer is thinner than 3 μm, the outer layer is worn away by the abrasion with a paper sheet in a short time, with the result that the inner layer, which is poor in its release property, is exposed to the outside so as to form the surface of the fixing roll. Naturally, the tonor off-set problem is brought about in thin case. On the other hand, if the outer layer is thicker than 50 μm, the electrostatic charging amount of the outer layer is significantly increased. In other words, the inner layer fails to prevent the outer layer from bearing an excessive electrostatic charge. Preferably, the thickness of the outer layer should fall within a range of between 7 μm and 15 μm in order to obtain sufficient effects of suppressing the changing voltage on the roll surface and of suppressing the tonor off-set problem.

As described previously, the total thickness of the PFA resin film forming the surface layer of the fixing roll is defined to fall within a range of between 20 μm and 500 μm. If the entire thickness of the PFA resin film is less than 20 μm, the PFA resin film is wrinkled by the change in temperature and by the repeated compressions during the use of the fixing roll, leading to a short life of the fixing roll. If the entire thickness of the PFA resin film is more than 500 μm, however, the surface of the fixing roll is rendered unduly hard, resulting in failure to ensure a sufficient nipping width required for the thermal fixing. Preferably, the entire thickness of the PFA resin film should fall within a range of between 20 μm and 130 μm.

In the present invention, it is desirable to use PFA resin alone as much as possible for forming the outer layer of the PFA resin film because the PFA resin exhibits a high release property, which is required for the outer surface of the fixing roll. On the other hand, it is important for the inner layer of the PFA resin film to exhibit a low resistivity, i.e., a volume resistivity of $10^{11}$ Ω.cm or less, in order to suppress the electrostatic charging on the roll surface, i.e., outer layer of the PFA resin film. For achieving the low volume resistivity, it is necessary to add fillers, for example, various kinds of carbon blacks, metal powder or metal-coated filters to the PFA resin used for forming the inner layer. There is no particular restriction in the present invention with respect to the kind of the PFA resin used for forming the outer layer, the PFA resin used for forming the inner layer, and the kind of the additive for lowering the volume resistivity of the inner layer. Preferably, the volume resistivity of the inner layer of the PFA resin film should fall within a range of between $10^3$ Ω.cm and $10^{11}$ Ω.cm.

The fixing roll of the present invention comprises a heat resistant elastic layer positioned beneath the surface layer formed of the PFA resin film. The heat resistant elastic layer can be formed of various heat resistant rubbers such as silicone rubber, fluorine rubber and ethylene-propylene copolymer rubber, and various heat resistant sponges such as silicone rubber sponge and fluorine rubber sponge. Of course, it is possible to add, as desired, various additives to the heat resistant elastic layer including, for example, a highly heat conductive material such as $Al_2O_3$ or SiC, a material such as carbon for imparting an electrical conductivity to the heat resistant elastic layer, an antistatic agent such as a surface active agent, a heat resistant additive, and a coloring agent. Further, the softness of the heat resistant elastic layer is not particularly restricted in the present invention as far as the heat resistant elastic layer is capable of withstanding the temperature at which the fixing roll is used and of ensuring a sufficient nipping width required for the thermal fixing.

For forming the PFA resin film as the surface layer of the fixing roll, the inner and outer layers of the PFA resin film may be simultaneously formed by using a biaxial extruder so as to form a tube of a two-layer structure, followed by covering the heat resistant elastic layer with the resultant tube. Alternatively, the inner layer is formed first on the surface of the heat resistant elastic layer by means of a coating method, followed by forming the outer layer on the surface of the inner layer by means of a coating or dipping method.

The fixing roll of the present invention also comprises a core metal positioned inside the heat resistant elastic layer. For forming the heat resistant elastic layer, it is possible to employ a compression molding method. Specifically, the surface of the core metal is coated first with an adhesive, followed by winding an unvulcanized raw material layer about the core metal and subsequently vulcanizing or vulcanizing-foaming the raw material layer within a mold of a high temperature so as to form a desired heat resistant elastic layer. Alternatively, it is also possible to employ an extrusion molding method. In this case, an unvulcanized raw material is continuously extruded, followed by vulcanizing or vulcanizing-foaming the extrudate within a heating furnace of a high temperature so as to obtain a heat resistant elastic tube. Then, the resultant tube is mounted to cover a core metal coated with an adhesive so as to form a desired heat resistant elastic layer. Of course, the present invention is not restricted by the methods of preparing the surface layer and the heat resistant elastic layer exemplified above.

EXAMPLE

Examples 1–5 and Controls 1 and 2:

A heat resistant elastic layer 11 about 5 mm thick is formed in direct contact with an adhesive layer (not shown) covering the circumferential surface of a core metal 12. A surface layer 13, which consists of a film of tetrafluoroethylene-perfluoroalkyl vinyl ether copolymer (PFA) resin, is formed surface of the heat resistant elastic layer 11. The PFA resin film 13 is of a double layer structure consisting of an inner layer **13*a* and an outer layer 13*b*. The outer layer 13*b* is formed of PFA resin alone, i.e., Teflon 450-J (trade name of a PFA resin manufactured by Mitsui-Du Pont Fluoro Chemical Co., Ltd.). The PFA resin used for forming the outer layer 13*b* exhibits a volume resistivity of $10^{16}$ Ω.cm or more. Also, the outer layer 13*b* has a thickness of 3 to 50 μm. On the other hand, the inner layer 13*a* is formed of a resin composition prepared by adding 18 parts by weight of Ketchenblack EC (trade name of a carbon black manufactured by Nippon E.C. Co., Ltd.) to 100 parts by weight of the PFA resin noted above. The inner layer 13*a*** thus formed exhibits a volume resistivity of $2.0\times10^7$ ω.cm or more.

A fixing roll constructed as shown in FIG. 1 was actually manufactured as follows. In the first step, a silicone rubber compound (silicon mixture) A was prepared by sufficiently mixing the starting materials given below:

| Starting Material | Parts by weight |
|---|---|
| KE7012U (trade name of a silicone rubber manufactured by Shin-etsu Kagaku Kogyo Co., Ltd. | 100 |
| C-8 (trade name of a vulcanizing agent for silicone rubber manufactured by Shin-etsu Kagaku Kogyo Co., Ltd. | 2 |
| Color RB (trade name of a coloring material manufactured by Shin-etsu Kagaku Kogyo Co., Ltd. | 2 |

On the other hand, the outer circumferential surface of a core metal 12 having a diameter of 10 mm was coated with an adhesive, followed by winding the silicon mixture A noted above about the adhesive-coated core metal such that the diameter of the resultant roll structure was about 22 mm. Then, a press vulcanization was applied to the silicon mixture A within a mold held at 150° C. for 30 minutes, followed by taking the roll structure out of the mold. Further, an after-ageing treatment was applied to the vulcanized structure at 200° C. for 4 hours, followed by cooling the roll structure to room temperature and subsequently applying a grinding treatment until the outer diameter of the roll was reduced to 19.9 mm so as to obtain a heat resistant elastic layer 11. The thickness of the heat resistant elastic layer was found to be about 5 mm. Also, the hardness of the resultant roll surface was found to be 25° when measured by JIS A type hardness tester and 48° when measured by ASKER C type hardness tester.

Further, a PFA resin film tube of a two-layer structure was prepared by means of extrusion using a biaxial tube extruder manufactured by Mitsuba Seisakusho Co., Ltd., the die head temperature of said biaxial tube extruder being set at about 370° C. The PFA resin film was of a two-layer structure consisting of an outer layer **13*b* and an inner layer 13*a*. Teflon 450-J (trade name of a PFA resin manufactured by Mitsui-Du Pont Fluoro Chemical Co., Ltd.) was used singly as a raw material of the outer layer 13*b*. On the other hand, the raw material of the inner layer 13*a* was prepared by adding 18 parts by weight of Ketchenblack EC (trade name of carbon black manufactured by Nippon EC Co., Ltd.) to 100 parts by weight of Teflon 450-J noted above. Seven kinds of PFA resin films differing from each other in the thickness of the inner layer 13*a* and/or the outer layer 13*b*** were prepared in this extrusion molding by changing, for example, the diameter of the outlet parts of the die head, as shown in Table 1 given below:

adhesive agent, thereby preparing fixing roll samples for Examples 1 to 5 and Controls 1 and 2.

Each of the fixing roll samples was used as a fixing roll in a Family Copier FC-2 manufactured by Canon Co., Ltd. so as to carry out a copying test. In the case of using the fixing roll according to any of Examples 1 to 5 of the present invention, copying was made on 100,000 paper sheets satisfactorily. The copying test was finished after the copying on the 100,000th paper sheet.

In the fixing roll used in Control 1, the outer layer of the PFA resin film was as thick as 60 μm. In this case, paper jaming which seemed to be caused by tonor off-set problem took place frequently when the number of the copied paper sheets reached about 73,000. Thus, the copying test was stopped. When the surface of the fixing roll was examined, a large amount of tonor and paper dust were found to have been deposited on the roll surface.

In the fixing roll used in Control 2, the outer layer of the PFA resin film was as thin as only 2 μm. In this case, the paper Jaming problem took place frequently when the number of the copied paper sheets reached about 32,000. When the surface of the fixing roll was examined, the outer layer of the PFA resin film was found to have been worn away in some portions. Deposition of tonor and paper dust was found about the portion where the outer layer had been worn away.

The hardness shown in Table 1 denotes the surface hardness of the fixing roll measured by an ASKER C type hardness meter. The charging voltage (V) on the roll surface shown in Table 1 was measured by using a surface potentiometer model 340 HV manufactured by Tolec Japan Inc. Specifically, the charging voltage on the fixing roll surface

TABLE 1

| | Example | | | | | Control | |
|---|---|---|---|---|---|---|---|
| | 1 | 2 | 3 | 4 | 5 | 1 | 2 |
| Outer layer thickness (μm) | 5 | 10 | 20 | 30 | 40 | 60 | 2 |
| Inner layer thickness (μm) | 55 | 50 | 40 | 30 | 20 | 10 | 60 |
| Hardness of heat resistant elastic layer | 48 | 48 | 48 | 48 | 48 | 48 | 48 |
| Hardness after formation of PFA film | 58 to 59 | 58 to 59 | 58 | 57 to 58 | 57 | 56 to 57 | 59 |
| Charging voltage on roll surface (V) | 0 to −50 | 0 to −120 | 0 to −130 | 0 to −190 | −30 to −200 | −400 to −800 | 0 to −20 |
| The number of copied paper sheets | 100000 more than | 100000 more than | 100000 more than | 100000 more than | 100000 more than | 73000 | 32000 |
| Cause of stopping operation | — | — | — | — | — | toner off-set | |

The volume resistivity of the PFA resin film was measured by High Resistance Model 4329A manufactured by Yokogawa Hulet Packard Co., Ltd., with the result that the PFA resin film was found to exhibit a volume resistivity of $10^{16}$ Ω.cm or more in the outer layer and $2.0\times10^{7}$ Ω.cm in the inner layer. Further, the inner diameter of the PFA resin film was set at about 19.5 mm in every sample.

In the next step, the PFA resin film of the two-layer structure was fitted over a roll having a silicone rubber of 25° formed on the surface region as the heat resistant elastic layer 12 and coated with an adhesive agent of KE 45 (trade name of a one-part RTV silicone rubber manufactured by Shin-etsu Kagaku Kogyo Co., Ltd.). The resultant roll structure was left to stand for 48 hours so as to cure the was measured about 20 to 30 seconds after continuous copying operation for 100 paper sheets at the starting time of the copying test.

Controls 3 and 4

In Control 3, a PFA resin film of a single layer structure was prepared by an extrusion molding. The PFA resin used exhibited a volume resistivity of $10^{16}$ Ω.cm or more, which was equal to that of the PFA resin used for forming the outer layer of the PFA resin film in each of Examples 1 to 5. Further, the heat resistant elastic layer used in Control 3 was equal to that used in each of Examples 1 to 5.

In Control 4, a PFA resin film of a single layer structure was prepared by an extrusion molding. The PFA resin exhibited a volume resistivity of $2.0\times10^7$ Ω.cm, which was equal to that of the PFA resin composition used for forming the inner layer of the PFA resin film in each of Examples 1 to 5.

A copying test was conducted by using the fixing roll prepared in each of Controls 3 and 4 as in Examples 1 to 5. Paper jaming caused by tonor off-set problem took place when the number of copied paper sheets reached 35,000 and 12,000 for the fixing rolls of Controls 3 and 4, respectively, so as to stop the copying test.

Examples 6 and 7

A fixing roll constructed as shown in FIG. 1 was manufactured. In the first step, a silicone rubber compound B (silicon mixture B) was prepared by sufficiently mixing the starting materials given below:

| | Parts by weight |
|---|---|
| KE904FU (trade name of a silicone rubber manufactured by Shin-etsu Kagaku Kogyo Co., Ltd.) | 100 |
| C-2 (trade name of a vulcanizing agent for silicone rubber manufactured by Shin-etsu Kagaku Kogyo Co., Ltd. | 1.0 |
| C-3 (trade name of a vulcanizing agent for silicone rubber manufactured by Shin-etsu Kagaku Kogyo Co., Ltd. | 3.0 |
| KE-P-13 (trade name of a silicone rubber foaming agent manufactured by Shin-etsu Kagaku Kogyo Co., Ltd. | 3.5 |

The silicon mixture B thus prepared was continuously extruded by using an extruder so as to form a tube. Then, the resultant tube was vulcanized and foamed within a heating furnace set at 250° C. for 10 minutes so as to obtain a silicone rubber sponge tube having an inner diameter of 9.5 mm and an outer diameter of 22 mm. The sponge tube thus prepared was fitted over a core metal 11 having a diameter of 10 mm and having the circumferential outer surface coated with an adhesive layer. Further, the adhesive coating was cured, followed by applying a grinding treatment until the outer diameter of the resultant roll was reduced to 20 mm so as to form a heat resistant elastic layer 12 consisting of a silicone rubber sponge. The hardness of the roll surface was found to be 32° when measured by an ASKER C type hardness tester.

Finally, a PFA resin film of a double layer structure shown in Table 2 was formed on the circumferential outer surface of the heat resistant elastic layer 12 as in Examples 1 to 5 so as to prepare a fixing roll for each of Examples 6 and 7. A copying test using the fixing roll thus prepared was conducted as in Examples 1 to 5. No problem was found after the copying operation for obtaining 100,000 copied paper sheets. No abnormality was found on the surface of the fixing roll after the copying test.

TABLE 2

| | Example | | Control | |
|---|---|---|---|---|
| | 6 | 7 | 3 | 4 |
| Outer layer thickness (μm) | 10 | 30 | 60 | — |
| Inner layer thickness (μm) | 60 | 60 | — | 60 |
| Hardness of heat resistant elastic layer | 32 | 32 | 48 | 48 |
| Hardness after formation of PFA film | 52 | 54 | 56 | 59 |
| Charging voltage on roll surface (V) | 0 to −100 | 0 to −120 | −800 to −19000 | 0 |
| The number of copied paper sheets | 100000 more than | 100000 more than | 34000 | 12000 |
| Cause of stopping operation | — | — | Toner off-set | |

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fixing roll, comprising a core metal, a heat resistant elastic layer formed to cover the circumferential outer surface of said core metal, and a surface layer formed to cover the circumferential outer surface of said heat resistant elastic layer, said surface layer being formed of a tetrafluoroethylene-perfluoroalkyl vinyl ether copolymer resin film of a double layer structure consisting of an inner layer having a volume resistivity of $10^{11}$ Ω.cm or less and an outer layer having a thickness falling within a range of between 3 μm and 50 μm, and the total thickness of said resin film falling within a range of between 20 μm and 500 μm.

2. The fixing roll according to claim 1, wherein said heat resistant elastic layer is formed of a material selected from the group consisting of silicone rubber, fluorine rubber, ethylene-propylene rubber, silicone rubber sponge, fluorine rubber sponge and ethylene-propylene rubber sponge.

3. The fixing roll according to claim 1, wherein said heat resistant elastic layer contains at least one additive selected from the group consisting of a material for imparting a high thermal conductivity to the heat resistant elastic layer, a material for imparting an electrical conductivity to the heat resistant elastic layer, an antistatic agent, a heat resistant additive, and a coloring material.

4. The fixing roll according to claim 3, wherein said material for imparting a high thermal conductivity to the heat resistant elastic layer is selected from the group consisting of $Al_2O_3$ and SiC.

5. The fixing roll according to claim 3, wherein said material for imparting a high thermal conductivity to the heat resistant elastic layer is carbon.

6. The fixing roll according to claim 1, wherein said inner layer of the resin film forming the surface layer is formed of a composite material prepared by adding at least one material selected from the group consisting of carbon black, metal powder and metal-coated filler to tetrafluoroethylene-perfluoroalkyl vinyl ether copolymer resin.

7. The fixing roll according to claim 1, wherein said outer layer of the resin film forming the surface layer is formed of tetrafluoroethylene-perfluoroalkyl vinyl ether copolymer resin.

* * * * *